United States Patent
Rushworth et al.

(10) Patent No.: US 8,095,727 B2
(45) Date of Patent: Jan. 10, 2012

(54) MULTI-READER, MULTI-WRITER LOCK-FREE RING BUFFER

(75) Inventors: Thomas Bryan Rushworth, Manning Park (CA); Angus Richard Telfer, Vancouver (CA)

(73) Assignee: Inetco Systems Limited, Burnaby (CA)

( * ) Notice: Subject to any disclaimer, the term of this patent is extended or adjusted under 35 U.S.C. 154(b) by 815 days.

(21) Appl. No.: 12/028,091

(22) Filed: Feb. 8, 2008

(65) Prior Publication Data

US 2009/0204755 A1  Aug. 13, 2009

(51) Int. Cl.
*G06F 12/00*  (2006.01)

(52) U.S. Cl. .................. 711/110; 711/E12.001; 710/52

(58) Field of Classification Search ........................ None
See application file for complete search history.

(56) References Cited

U.S. PATENT DOCUMENTS

| | | | |
|---|---|---|---|
| 5,974,483 A | 10/1999 | Ray et al. | |
| 6,304,924 B1 * | 10/2001 | Varma | 710/52 |
| 6,622,205 B1 | 9/2003 | Weiss | |
| 7,716,396 B1 | 5/2010 | Liu et al. | |
| 2006/0048162 A1 | 3/2006 | Boult | |

FOREIGN PATENT DOCUMENTS

JP  2005-309698  11/2005

OTHER PUBLICATIONS

Lamport, Leslie, "Concurrent Reading and Writing," Communications of the ACM, Nov. 1977, vol. 20, No. 11.

Herlihy, Maurice P., et al., "Linearizability: A Correctness Condition for Concurrent Objects," ACM Trans. on Prog. Lang. and Sys., vol. 12, No. 3, Jul. 1990, pp. 463-492.

Herlihy, Maurice, "Wait-Free Synchronization," ACM Trans. on Programming Languages and Systems, vol. 11, No. 1, Jan. 1991, pp. 124-149.

Doherty, S., et al., "Bringing Practical Lock-Free Synchronization to 64-Bit Applications," PODC'04, Jul. 25-28, 2004, St. Johns, NFLD, Canada.

Doherty, S., et al., "DCAS is not a Silver Bullet for Nonblocking Algorithm Design," SPAA'04, Jun. 27-30, 2004, Barcelona, Spain.

Herlihy, Maurice, "Nonblocking Memory Management Support for Dynamic-Sized Data Structures," ACM Transactions on Computer Systems, vol. 23, No. 2, May 2005, pp. 146-196.

Michael, Maged M., "Brief Announcemnet: Completing the Lock-Free Dynamic Cycle," PODC'04, Jul. 25-28, 2004, St. John's NFLD, CA.

Fomitchev, Mikhail, et al., "Lock-Free Linked Lists and Skip Lists," PODC'04, Jul. 25-28, 2004, St. John's, Nfld, Canada.

Sundell, Hakan, et al, "Scalable and Lock-Free Concurrent Dictionaries," SAC'04, Mar. 14-17, 2004, Nicosia, Cyprus.

Michael, Maged M., "High Performance Dynamic Lock-Free Hash Tables and List-Based Sets," SPAA'02, Aug. 10-13, 2002, Winnipeg, Manitoba, CA.

(Continued)

*Primary Examiner* — Reginald Bragdon
*Assistant Examiner* — Eric Loonan
(74) *Attorney, Agent, or Firm* — Joseph Conneely; McCarthy Tetrault LLP

(57) ABSTRACT

A method for accessing cells of a ring buffer by one or more writers, wherein the one or more writers are prevented from simultaneously accessing a cell of the ring buffer. In addition, a method for accessing cells of a ring buffer by one or more readers, wherein the one or more readers are prevented from simultaneously accessing a cell of the ring buffer.

22 Claims, 19 Drawing Sheets

OTHER PUBLICATIONS

Michael, Maged M., "Safe Memory Reclaimation for Dynamic Lock-Free Objects Using Atomic Reads and Writes," PODC 2002, Jul. 21-24, 2002, Monterey, California.

Michael, Maged M., "Scalable Lock-Free Dynamic Memory Allocation," PLDI'04, Jun. 9-11, 2004, Washington, DC, USA.

Hendler, Danny, et al., "A Scalable Lock-Free Stack Algorithm," SPAA'04, Jun. 27-30, 2004, Barcelona, Spain.

Schneider, Scott, et al., "Scalable Locality-Conscious Multithreaded Memory Allocation," ISMM'06, Jun. 10-11, 2006, Ottawa, Ontario, CA.

Zhu, W., et al., "Synchronization State Buffer: Supporting Efficient Fine-Grain Synchronization on Many-Core Architectures," ISCA'07, Jun. 9-13, 2007, San Diego, California.

Detlefs, D., et al., "A Theorem Prover for Program Checking," 2005 ACM 0004-5411/05/0500-0365. May 2005.

Van Kreveld, M., et al., "Union-Copy Structures and Dynamic Segment Trees," Journal of the Association for Computing Machinery, vol. 40, No. 3, Jul. 1993, p. 635-652.

Cheng, P., et al., "A Parallel, Real-Time Garbage Collector," PLDI 2001, Jun. 2001, Snowbird, Utah, USA.

Parkinson, M., et al., "Modular Verification of a Non-Blocking Stack," POPL'07, Jan. 17-19, 2007, Nice, France.

Vafeiadis, V., et al., "Proving Correctness of Highly-Concurrent Linearisable Objects," 2006 ACM 1-59593-189-9/06/0003, Mar. 2006.

Shalev, O., et al., "Split-Ordered Lists: Lock-Free Extensible Hash Tables," Journal of the ACM, vol. 53, No. 3, May 2006, pp. 379-405.

Jones, M. Tim, "Virtual Linux, An overview of virtualization methods, architectures, and impl.," http://www-128.ibm.com/developerworks/linux/library/l-linuxvirt, Jan. 2, 2007.

Fober, D. et al., "Optimised Lock-Free FIFO Queque", Grame—Computer Music Research Laboratory, Jan. 2001.

International Preliminary Report on Patentability for PCT/CA2009/000124, Mailed Aug. 19, 2010.

Detlefs, David L., et al., "Lock-Free Reference Counting", SunMicrosystems, Inc., ACM Symposium, Aug. 26-28, 2001.

Demaine, E., et al., "Adaptive Set Intersections, Unions, and Differences", ACM Symposium, Jan. 9-11, 2000.

Michael, Maged M., et al., "Simple, Fast, and Practical Non-Blocking and Blocking Concurrent Queue Algorithms", 1996 ACM 0-89791-800-2/96/05, May 23-26, 2006.

Herlihy, Maurice P., et al., "Lock-Free Garbage Collection for Multiprocessors", 1991 AGN 089791-438-4/9/0007/0229, Jul. 21-24, 1991.

Valois, John D., "Lock-Free Linked Lists Using Compare-and-Swap", PODC 95, Ottawa, Ontario, CA, Aug. 20-23, 1995.

Fober, et al., "Optimized Lock-Free Fifo Queue", Grame—Computer Music Research Laboratory, Jan. 2001.

Michael, et al., "Simple, Fast, and Practical Non-Blocking and Blocking Concurrent Queue Algorithms", 1996 ACM, May 23, 1996.

European Patent Office, Extended European Search Report for European Patent Application No. 09709097.1, Oct. 10, 2011.

* cited by examiner

FIG. 12

```
/*
 * Pseudo Code Implementation of Lock Free Ring Buffers.
 */ typedef struct lfmrwrb_index
{
        volatile int done;
        volatile int reserved;
} lfmrwrb_index;

/*
 * This is an arbitrairily chosen value used for the purpose of illustration.
 * Use a power of two and '&' instead of '%' for more speed.
 */ define RB_SIZE 10 typedef struct lfmrw_ring_buffer
{
        lfmrwrb_index reader;
        lfmrwrb_index writer;
        int size;
        int element[RB_SIZE];
} lfmrw_ring_buffer;

extern int compare_and_swap(volatile int *locn, int old, int new);

/*
 * Write operation.
 */ int lfmrwrb_write(lfmrw_ring_buffer *rb, int value_to_write)
{
        /*
         * Returns 1 if write is successful, 0 otherwise.
         */
        int old, new;
        do
        {
                /*
                 * Copy the "reserved" value.                          (See FIG. 4)
                 */
                old = rb->writer.reserved;
```

FIG. 12 (Continued)

```
        /*
         * Compute a trial value.                          (See FIG. 5)
         */
        new = (old + 1) % rb->size;

/*
         * Test for overrun.                               (See FIG. 6a)
         * This test actually leaves one element unused,
         * as a means of distinguishing between the two
         * cases completely full and empty.
         */
        if (new == rb->reader.done)
        {
                /* rb is full. (Well, RB_SIZE-1 full anyway.) */
                return(0);
        }
    }

/*
     * Reservation attempt.                                (See FIG. 7)
     */
    while (!compare_and_swap(&rb->writer.reserved,old,new));

/*
     * Fill the reserved slot.                             (See FIG. 8)
     * We have successfully reserved element[new], write it.
     */
    rb->element[new] = value_to_write;

/*
     * Let the reader(s) know it's done by updating the done value.  (See FIG. 9)
     * Observe the done index until it is equal to the old value.
     */
    while (old != rb->writer.done) /* spin */ ;

/*
     * Update the done index to the new value.             (See FIG. 10)
     */
    rb->writer.done = new;

/*
     * Operation complete ... Success.                     (See FIG. 11)
     */
    return(1);
}
```

FIG. 12 (Continued)

```
/*
 * Read Operation.
 */ int lfmrwrb_read(lfmrw_ring_buffer *rb, int *value_read)
{
        /*
         * Returns 1 if read is successful, 0 otherwise.
         */
        int old,new;
        do
        {
                /*
                 * Copy the "reserved" value.                    (See FIG. 4)
                 */
                old = rb->reader.reserved;

/*
                 * Test for overrun.                             (See FIG. 6b)
                 */
                if (old == rb->writer.done)
                {
                        /* rb is empty. */
                        return(0);
                }

/*
                 * Compute a trial value.                        (See FIG. 5)
                 */
                new = (old + 1) % rb->size;
        }

/*
         * Reservation attempt.                                  (See FIG. 7)
         */
        while (!compare_and_swap(&rb->reader.reserved,old,new));
```

FIG. 12 (Continued)

```
/*
 * Empty the reserved slot.                              (See FIG. 8)
 * We have successfully reserved element[new], read it.
 */
*value_read = rb->element[new];

/*
 * Let the writers(s) know it's done by updating the done value.  (See FIG. 9)
 * Observe the done index until it is equal to the old value.
 */
while (old != rb->reader.done) /* spin */ ;

/*
 * Update the done index to the new value.              (See FIG. 10)
 */
rb->reader.done = new;

/*
 * Operation complete ... Success.                      (See FIG. 11)
 */
return(1);
}
```

MULTI-READER, MULTI-WRITER LOCK-FREE RING BUFFER

FIELD OF THE INVENTION

This invention relates to the field of ring buffers for data processing systems, and more specifically, to a multi-reader, multi-writer lock-free ring buffer for a data processing system.

BACKGROUND OF THE INVENTION

In computer software, a "ring buffer", otherwise know as a "circular buffer", is a contiguous array of data cells which can contain arbitrary data. The data is inserted by "writers" which insert data into successive cells and read by "readers" which examine the cells in order. The key defining characteristic that makes a buffer a "ring buffer" is the fact that, on reaching the last element of the array, the writer and reader then independently loop back to the beginning of the array. Thus, a ring buffer can be thought of as an endless loop with the reader tracking behind the writer. FIG. 1 is a block diagram illustrating a single-writer, single-reader ring buffer 100. The single-writer, single-reader ring buffer 100 includes a contiguous array of memory cells 110 together with two indices, pointers, or counters 140, 150 used in a circular or ring-like fashion. Data values are placed sequentially in the cells 110 until the end of the array is reached, whereupon the placement "circles" back to the beginning of the array. The two indices 140, 150 typically follow a well-known algorithm for single-reader, single-writer queues. Ring buffers are sometimes described as first-in, first-out ("FIFO") queues (or a queue where elements are removed in the same order they are added), but a more common meaning for a "queue" is a list based data structure which can expand to an arbitrary size. A ring buffer, on the other hand, is limited in size to a fixed number of data cells 110.

Ring buffers are commonly used in computers and data processing systems for passing information from one program, process, or thread to another. For example, a writer 120 may put references to messages into a ring buffer 100 as they are received. A reader 130 may then read these references and so access the message for further processing. As long as there is one writer 120 and one reader 130, the implementation of a lock-free ring buffer 100 is well known. The writer 120 puts data into the ring buffer 100 while making sure that it does not overtake the reader 130. The reader 130 accesses the data while ensuring that it doesn't get ahead of the writer 120. Likewise, solutions exist for non-locking access to list based queues. Unfortunately, these do not apply to ring buffers, for which no effective lock free solution currently exists as will be discussed below.

Problems are encountered when there is more than one writer 120 and/or more than one reader 130 in a multi-threaded, concurrent, shared memory environment. This situation is shown in FIG. 2. FIG. 2 is a block diagram illustrating a multi-reader, multi-writer ring buffer 200. In the case of multiple writers 220, 221, care must be taken to not have two writers 220, 221 write into the same slot 210 due to the fact that they are accessing it simultaneously. If they do, one of the references will be lost. In the case of multiple readers 230, 231, care must be taken to not have two readers 230, 231 read the same slot 240 due to the fact that they are accessing it simultaneously. If they do, the reference will be read twice instead of once resulting in duplication.

The problem encountered with multiple readers 230, 231 and multiple writers 220, 221 is greatest in environments with a large degree of parallelism (e.g., such as in today's multi-core processors), where a large amount of modularization exists (e.g., such as when processing a protocol stack one level at a time), and in systems requiring very low latency (e.g., such as real-time data communications and operating systems applications).

For reference, a data structure implementation is said to be "lock-free" if it guarantees that after a finite number of steps of any thread operating on the data structure, some thread (not necessarily the same one) operating on the data structure completes. A "thread", short for a "thread of execution", is a set of instructions being interpreted (i.e., executed) by a central processing unit ("CPU") or CPU core. A thread usually has some small amount of private (i.e., to the thread) memory, and otherwise shares most memory with other threads. A "multi-threaded shared memory model" is a common model for recent multi-core CPUs where each CPU is executing one or more threads and where many of the threads share a single memory address space. Note that it is quite common for more than one thread to execute the same set of instructions at different positions in the instructions and with different private (i.e., thread local) memory. An "index" into a ring buffer is a number ranging in value from zero to the size of the ring buffer minus one. A compare-and-swap ("CAS") operation (e.g., an atomic (i.e., indivisible) CAS) is a computer instruction typically implemented on recent general purpose processors. A load linked/store conditional "LL/SC" pair is a pair of computer instructions available on some general purpose processors which can be used to replace the CAS instruction. A "critical section" is a section of instructions for a given thread that must be executed (from the viewpoint of any other threads) as if all the instructions happened without intervening actions from other threads.

Several lock-free algorithms have been proposed in the literature. For example, Lamport (Leslie Lamport, "Concurrent Reading and Writing", Communications of the ACM, Vol. 20, No. 11, November 1977, which is incorporated herein by reference) took a very early look at concurrent reading and writing and identified some of the problems. Herlihy and Wing (Maurice P. Herlihy and Jeannette M. Wing, "Linearizability: A Correctness Condition for Concurrent Objects", ACM Transactions on Programming Languages and Systems, Vol. 12, No. 3, July 1990, which is incorporated herein by reference) defined a correctness condition for concurrent data structures that has been used by almost every subsequent publication in the area. Herlihy (Maurice P. Herlihy, "Wait Free Synchronization", ACM Transactions on Programming Languages and Systems, Vol. 11, No. 1, January 1991, which is incorporated herein by reference) proved that the then-popular synchronization instructions were inadequate, and went on to show that the CAS instruction was "universal" in that it could be used to simulate any desired data structure, although very inefficiently. Michael and Scott (Maged M. Michael and Michael L. Scott, "Simple, Fast, and Practical Non-Blocking and Blocking Concurrent Queue Algorithms", PODC'96, Philadelphia Pa., USA, which is incorporated herein by reference) gave the first reasonable implementation of lock-free list based queues, but there remained problems with the associated lock-free memory management as seen in Herlihy et al. (Maurice Herlihy, Victor Luchangco, Paul Martin, and Mark Moir, "Nonblocking Memory Management Support for Dynamic-Sized Data Structures", ACM Transactions on Computer Systems, Vol. 23, No. 2, May 2005, which is incorporated herein by reference), and even there the proposed solution requires more time and space than desirable. The demonstrated difficulty of obtaining correct algorithms has led to investigation and use of alternatives to CAS or simulation of the alternatives by CAS as by Doherty, Herlihy, Luchangco and Moir (Simon Doherty, Maurice P. Herlihy, Victor Luchangco and Mark Moir, "Bringing Practical Lock-Free Synchronization to 64-Bit Applications", PODC'04, Jul. 25-28, 2004, St. John's Newfoundland, Canada, which is incorporated herein by reference). The difficulty is also discussed by Doherty et al. (Simon Doherty, David L. Detlefs, Lindsay Groves, Christine H. Flood, Victor Luchangco, Paul A. Martin, Mark Moir, Nir Shavit and Guy L. Steel Jr., "DCAS is not a Silver Bullet for Nonblocking Algorithm Design", SPAA'04, Jun. 27-30, 2004, Barcelona, Spain, which is incorporated herein by reference), where the development history for a double-ended list-based queue algorithm is presented, detailing the discovery of errors in the algorithm even after publication, and going on to claim that more powerful instructions than CAS are not going to make algorithm development any easier. These difficulties remain unresolved.

Given the above, it is apparent that current practice with respect to ring buffers has centered around lock-free implementations involving one writer and one reader. However, these solutions do not scale to cover the problems that arise when multiple writers or multiple readers are involved.

Two current ways of achieving lock-free access to a ring buffer in a multi-reader, multi-writer environment are as follows. First, by providing a ring buffer for every writer/reader pair (i.e., turn the problem back into a single reader/writer environment). This is disadvantageous, however, as it involves the use of many ring buffers (i.e., in the worst case $N^2$) and an associated large increase in the amount of scheduling needed in order to decide which thread to execute. Second, by defining the piece of software which does the actual accessing of the ring buffer as a "critical section" and use a "mutex" to protect the critical section. A mutex (e.g., such as semaphores) is a mechanism for ensuring "mutual exclusion" as a means of implementing critical sections. While the execution is taking place within this critical section, all other threads which are attempting to access the ring buffer will be blocked. This is disadvantageous, however, as it works at the expense of blocking concurrent access to the ring buffer and therefore increases latency.

A need therefore exists for an improved multi-reader, multi-writer lock-free ring buffer. Accordingly, a solution that addresses, at least in part, the above and other shortcomings is desired.

SUMMARY OF THE INVENTION

According to one aspect of the invention, there is provided a method for accessing cells of a ring buffer by one or more writers, comprising: storing a current writer cell position value in each of a done writer index and a reserved writer index; storing a current reader cell position value in a done reader index; copying the current writer cell position value to an old writer variable of a writer of the one or more writers; assigning a trial next writer cell position value to a new writer variable of the writer; accepting the trial next writer cell position value if the trial next writer cell position value is not equal to the done reader index value; as a single operation, first, accepting the trial next writer cell position value as a next writer cell position value if the reserved writer index value is equal to the old writer variable value, and second, replacing the reserved writer index value with the new writer variable value; writing data by the writer to a cell of the ring buffer indicated by the next writer cell position value; and, when the done writer index value is equal to the old writer variable value, replacing the done writer index value with the new writer variable value; whereby the one or more writers are prevented from simultaneously accessing the cell of the ring buffer.

In the above method, the current writer cell position value may be not equal to the current reader cell position value. The trial next writer cell position value may be equal to the old writer variable value plus one all modulo a number of cells in the ring buffer. The single operation may be an atomic operation. The single operation may be a compare-and-swap ("CAS") operation. The single operation may be a load linked/store conditional ("LL/SC") pair operation. The done writer index value, the reserved writer index value, and the done reader index value may be stored in shared memory accessible by the one or more writers. The old writer variable value and the new writer variable value may be stored in local memory of the writer. The writer may be implemented by a thread and the local memory may be thread local memory. And, the ring buffer may be a circular list; the done writer index may be a done writer pointer; the reserved writer index may be a reserved writer pointer; and, the done reader index may be a done reader pointer.

According to another aspect of the invention, there is provided a method for accessing cells of a ring buffer by one or more readers, comprising: storing a current reader cell position value in each of a done reader index and a reserved reader index; storing a current writer cell position value in a done writer index; copying the current reader cell position value to an old reader variable of a reader of the one or more readers; assigning a trial next reader cell position value to a new reader variable of the reader; accepting the trial next reader cell position value if the old reader variable value is not equal to the done writer index value; as a single operation, first, accepting the trial next reader cell position value as a next reader cell position value if the reserved reader index value is equal to the old reader variable value, and second, replacing the reserved reader index value with the new reader variable value; reading data by the reader from a cell of the ring buffer indicated by the next reader cell position value; and, when the done reader index value is equal to the old reader variable value, replacing the done reader index value with the new reader variable value; whereby the one or more readers are prevented from simultaneously accessing the cell of the ring buffer.

In the above method, the current reader cell position value may be not equal to the current writer cell position value. The trial next reader cell position value may be equal to the old reader variable value plus one all modulo a number of cells in the ring buffer. The single operation may be an atomic operation. The single operation may be a compare-and-swap ("CAS") operation. The single operation may be a load linked/store conditional ("LL/SC") pair operation. The done reader index value, the reserved reader index value, and the done writer index value may be stored in shared memory accessible by the one or more readers. The old reader variable value and the new reader variable value may be stored in local memory of the reader. The reader may be implemented by a thread and the local memory may be thread local memory. And, the ring buffer may be a circular list; the done reader index may be a done reader pointer; the reserved reader index may be a reserved reader pointer; and, the done writer index may be a done writer pointer.

In accordance with further aspects of the present invention there is provided an apparatus such as a data processing system, a method for adapting this system, as well as articles of manufacture such as a computer readable medium having program instructions recorded thereon for practicing the method of the invention.

BRIEF DESCRIPTION OF THE DRAWINGS

Further features and advantages of the embodiments of the present invention will become apparent from the following detailed description, taken in combination with the appended drawings, in which:

FIG. 12 is a listing of exemplary pseudo code for implementing the multi-reader, multi-writer lock-free ring buffer in accordance with an embodiment of the invention;

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain software, circuits, structures and techniques have not been described or shown in detail in order not to obscure the invention. The term "data processing system" is used herein to refer to any machine for processing data. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware.

Figure 13:
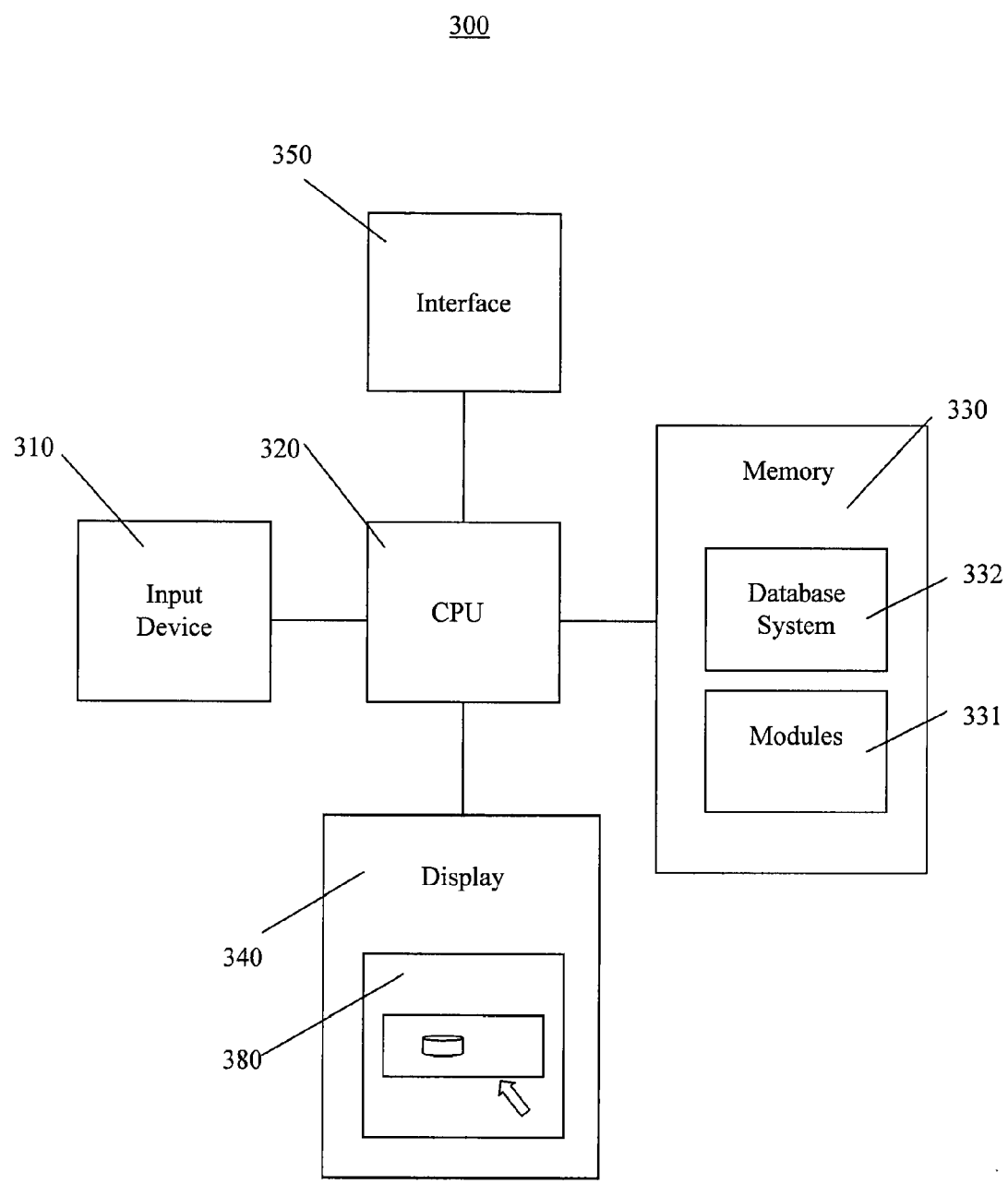
FIG. 13 is a block diagram illustrating a data processing system adapted to implement an embodiment of the invention.

FIG. 13 is a block diagram illustrating a data processing system 300 adapted to implement an embodiment of the invention. The data processing system 300 may be a server system or a personal computer ("PC") system and is suitable for operation as a network device. The data processing system 300 includes a central processing unit ("CPU") 320, memory 330, and an interface device 350 and may optionally include an input device 310 and a display 340. The CPU 320 may include dedicated coprocessors and memory devices. The CPU 320 is operatively coupled to memory 330 which stores an operating system (not shown) for general management of the system 300, executable code for the system, configuration information, data stores, etc. The memory 330 may include RAM, ROM, disk devices, flash memory, etc. The memory 330 may include a variety of storage devices including internal memory and external mass storage typically arranged in a hierarchy of storage as understood to those skilled in the art. The interface device 350 may include one or more connections including local area network connections, dial network connections, wireless network connections, file system connections, database connections, messaging connections, operating system "pipe" connections, connections via shared memory, etc. The data processing system 300 is adapted for communicating with other data processing systems (not shown) over a network (not shown) via the interface device 350. The input device 310 may include a keyboard, a mouse, a trackball, or a similar device. The display 340 may include a computer screen, terminal device, or a hardcopy producing output device such as a printer or plotter. The CPU 320 of the system 300 is typically coupled to one or more input devices 310 for receiving user commands or queries and for displaying the results of these commands or queries to the user on the display 340. Commands and queries may also be received over a network connection, and results may be transmitted over a network connection. The data processing system 300 may include a database system 332 for storing data and programming information. The database system 332 may include a database management system ("DBMS") and a database and may be stored in the memory 330 of the data processing system 300. The data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more hardware modules (not shown) or software modules 331 resident in the memory 330 of the data processing system 300. Alternatively, the programmed instructions may be embodied on a computer readable medium (such as a CD disk, flash memory, or floppy disk) which may be used for transporting the programmed instructions to the memory 330 of the data processing system 300. Alternatively, the programmed instructions may be embedded in a computer-readable signal or signal-bearing medium that is uploaded to a network by a vendor or supplier of the programmed instructions, and this signal or signal-bearing medium may be downloaded through an interface (e.g., 350) to the data processing system 300 from the network by end users or potential buyers.

Optionally, a user may interact with the data processing system 300 and its hardware and software modules 331 using a user interface ("UI") 380. The UI 380 may be used for monitoring, managing, and accessing the data processing system 300. UIs are supported by common operating systems and provide a format which enables a user to choose commands, execute application programs, manage computer files, and perform other functions selected from a menu through use of an input or pointing device such as a keyboard or mouse 310 or by entering a command.

The present invention provides an improved multi-reader, multi-writer lock-free ring buffer. In general, the invention provides a method of providing lock-free access to a ring buffer by multiple readers and/or writers using only two local variables and a compare-and-swap ("CAS") operation.

Figure 1:
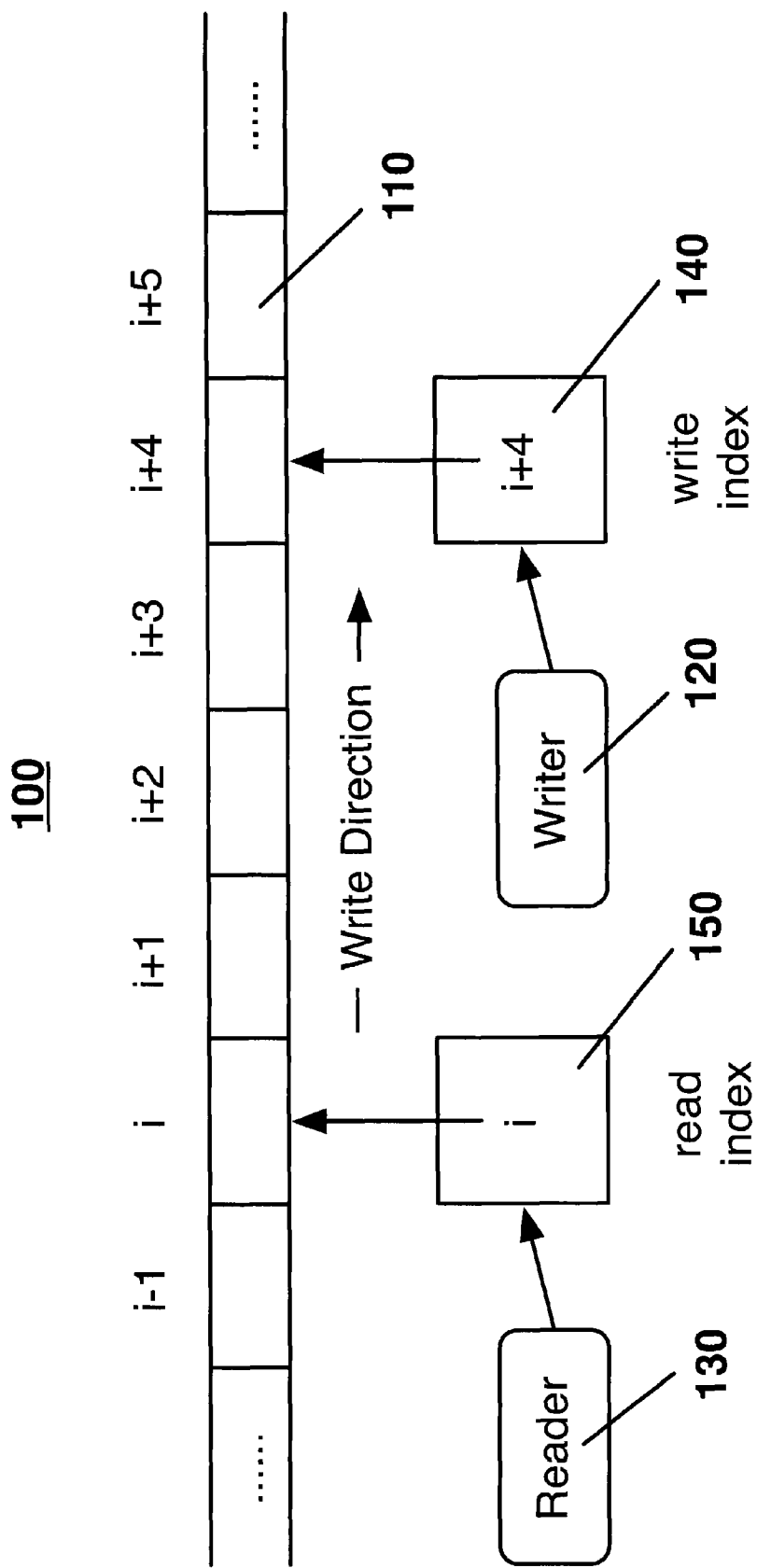
FIG. 1 is a block diagram illustrating a single-writer, single-reader ring buffer.
Figure 2:
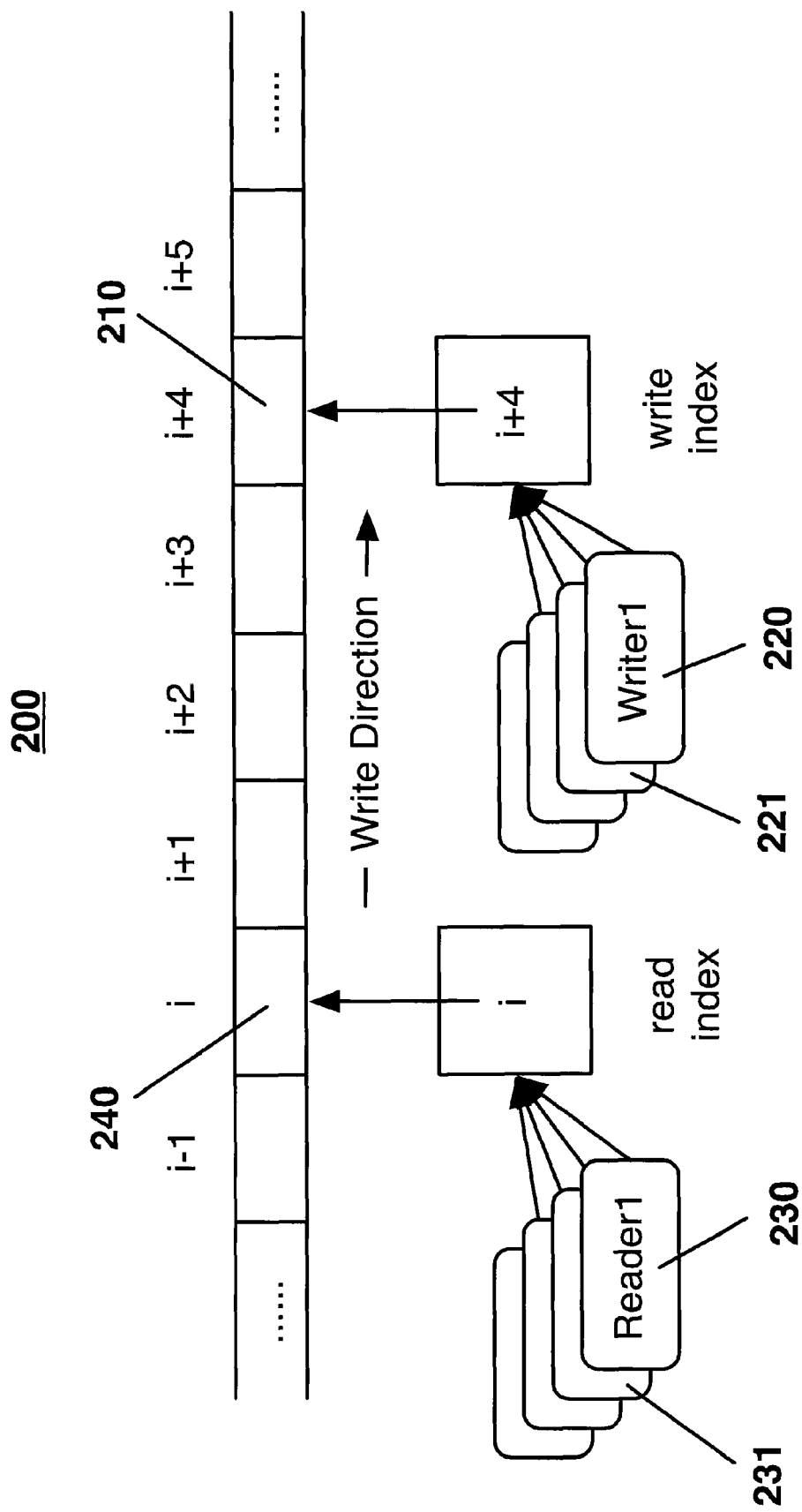
FIG. 2 is a block diagram illustrating a multi-reader, multi-writer ring buffer.
Figure 3:
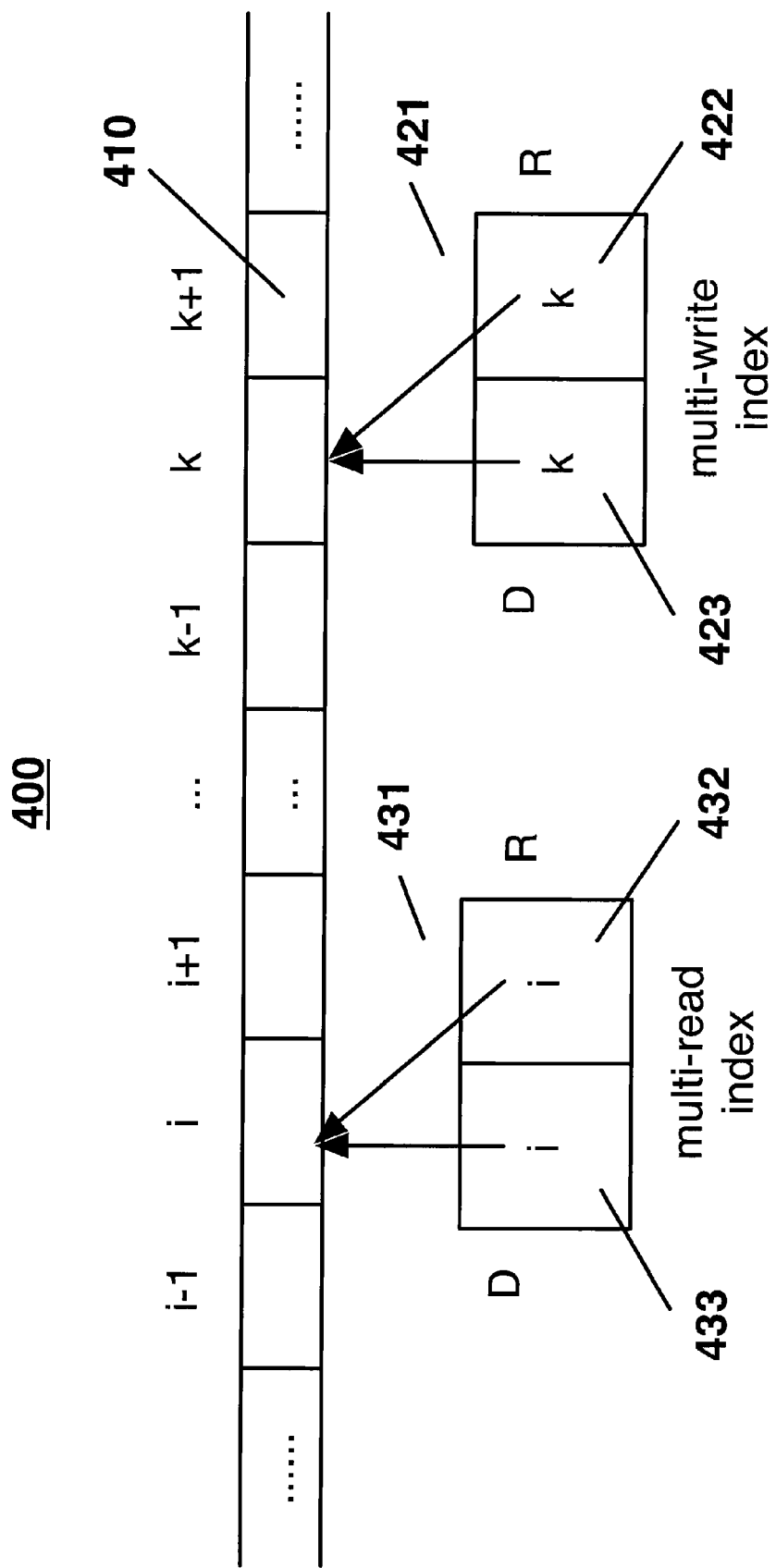
FIG. 3 is a block diagram illustrating a multi-reader, multi-writer lock-free ring buffer in accordance with an embodiment of the invention.

FIG. 3 is a block diagram illustrating a multi-reader, multi-writer lock-free ring buffer 400 in accordance with an embodiment of the invention. Recognizing that each of the indices 140, 150 used in the single-reader/writer ring buffer 100 serves two purposes, where the first purpose is to indicate where the next read or write operation is to take place, and the second is to indicate where the opposite end's operations should stop, the multi-reader, multi-writer lock-free ring buffer 400 of the present invention implements two "multi-indices" 421, 431, where each "multi-index" 421, 431 includes "Reserved" 422, 432 and "Done" 423, 433 ring buffer indices. As shown in FIG. 3, the invention implements each of the read and write multi-indices 421, 431 by means of two components containing the different aspects of a single index, namely, a Reserved ("R") index 422, 432 and a Done ("D") index 423, 433. The steps described below and illustrated in FIGS. 4-11 are then used to complete implementation of the lock-free ring buffer 400.

Note that since the single-reader/writer ring buffer 100 may have several variations with respect to how the indices are actually implemented (such as by pointers, counters or indices), the modulo operation for the indices (or its equivalent for pointers or counters), used to do the looping back to the beginning of the array, can be performed either when the indices are incremented or at the time the indices are used to index the ring buffer. The first way (i.e., when the indices are incremented) is the approach described in the following but it is understood that the multi-index ring buffer 400 can be implemented either way.

In FIG. 3, note that the initial state of the multi-write index 421 is the value k for each of the Reserved 422 and Done 423 indices. The value k is an index value which points to or refers to a cell (e.g., 410) of the ring buffer 400. Similarly, the initial state of the multi-read index 431 is the value i for each of the Reserved 432 and Done 433 indices. The value i is an index value which points to or refers to a cell (e.g., 410) of the ring buffer 400.

Figure 4:
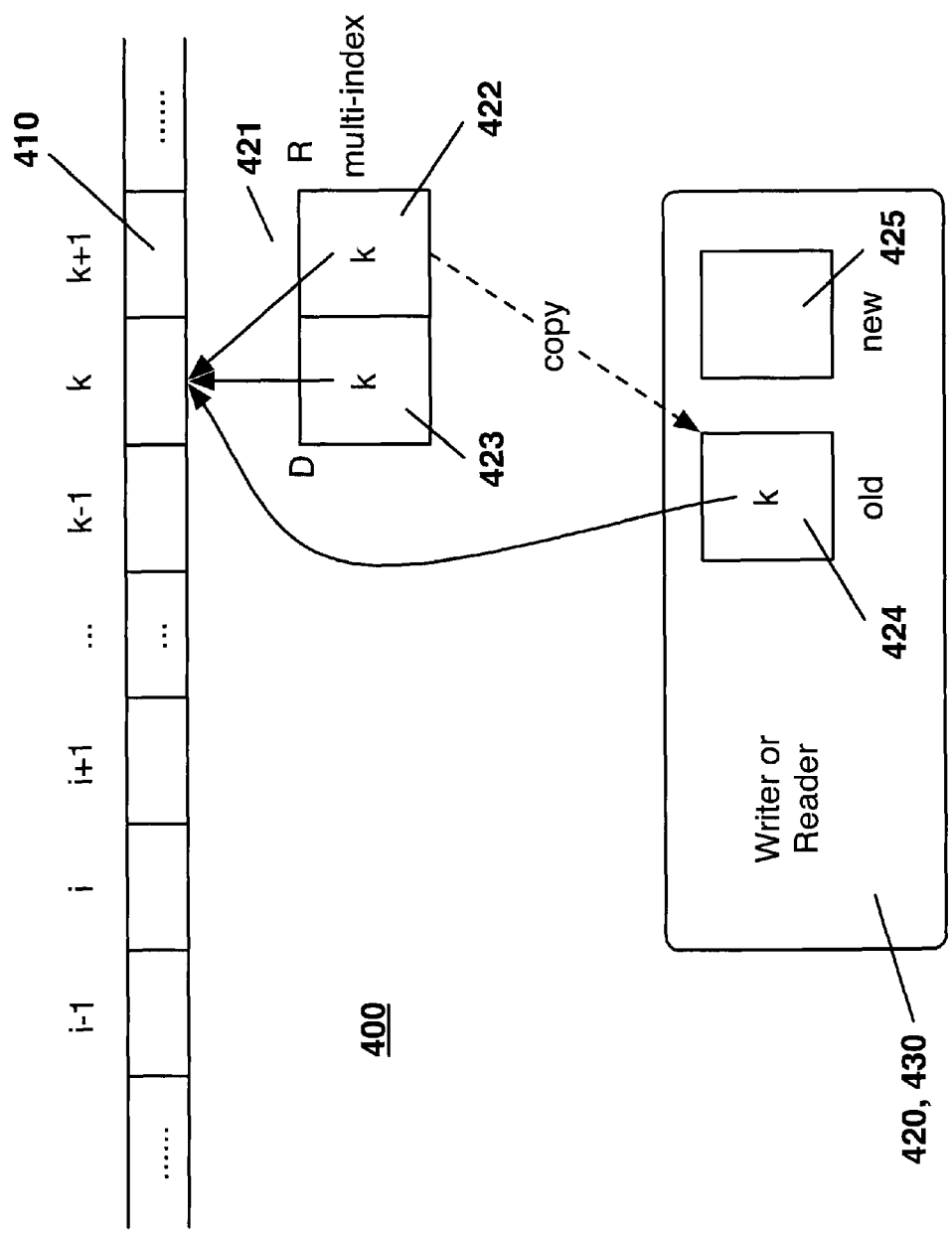
FIG. 4 is a block diagram illustrating saving of an initial index state for the multi-reader, multi-writer lock-free ring buffer in accordance with an embodiment of the invention.

FIG. 4 is a block diagram illustrating saving of an initial index state for the multi-reader, multi-writer lock-free ring buffer 400 in accordance with an embodiment of the invention. As shown in FIG. 4, the value k in the "Reserved" index 422 is copied into local variable "old" 424. Note that the ring buffer 400, each writer 420, each reader 430, writer indices 421-423, reader indices 431-433, and variables 424, 425 may be stored in the memory 330 and/or in modules 331 in the memory 330 of the data processing system 300.

Figure 5:
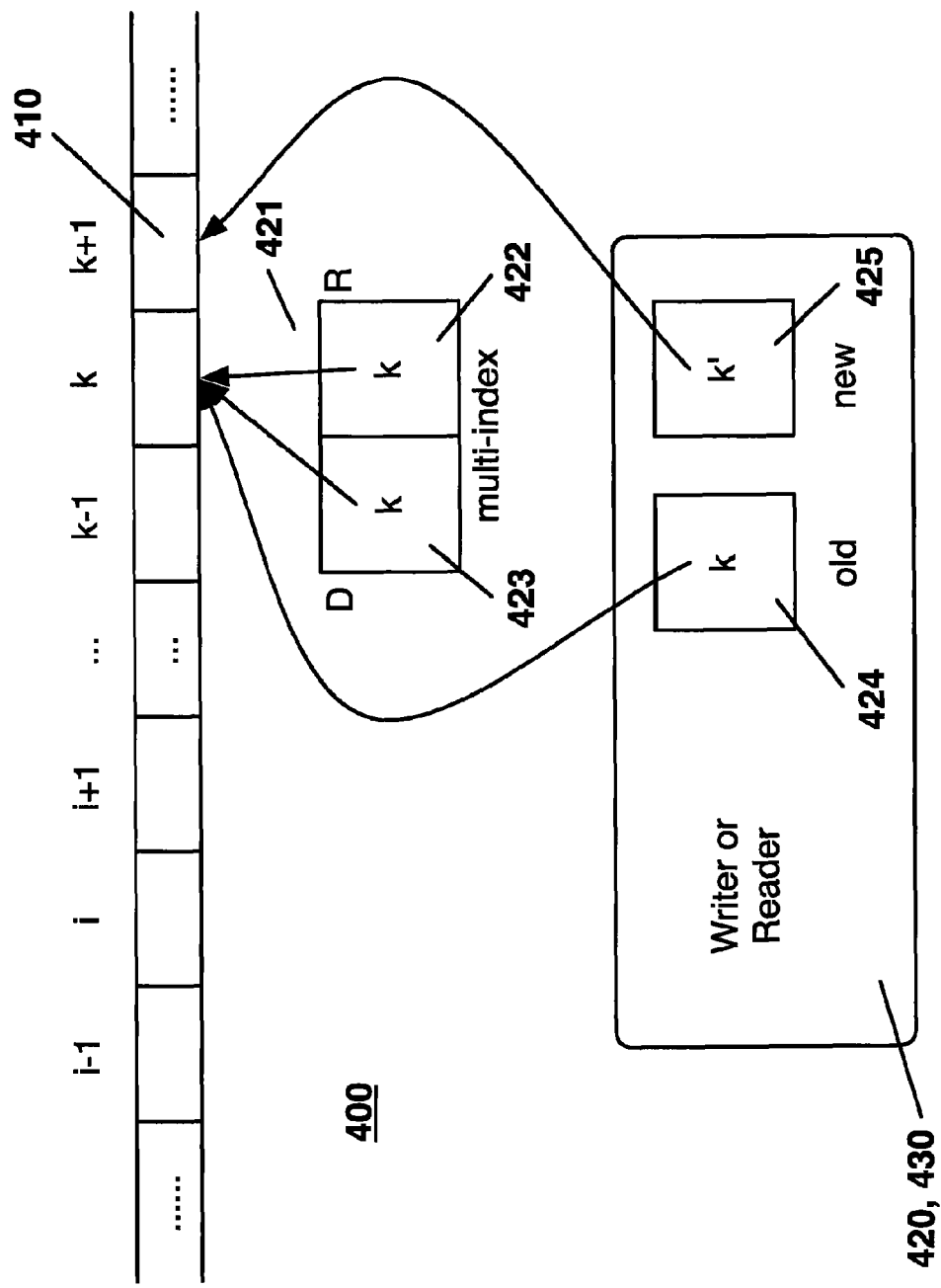
FIG. 5 is a block diagram illustrating making a trial value for the multi-reader, multi-writer lock-free ring buffer in accordance with an embodiment of the invention.

FIG. 5 is a block diagram illustrating making a trial value for the multi-reader, multi-writer lock-free ring buffer 400 in accordance with an embodiment of the invention. As shown in FIG. 5, the making of a "trial" value k' involves assigning local variable "new" 425 with the value (i.e., k) of the "old" 424 variable plus one all modulo the size of the ring buffer 400 (i.e., k'=mod (k+1, n), where n is the number of cells 410 in the ring buffer 400). For example, for n=5, then k may equal 0, 1, 2, 3 or 4, so that: for k=0, k'=mod (0+1, 5)=mod (1, 5)=1; for k=1, k'=mod (1+1, 5)=mod(2, 5)=2; for k=2, k'=mod (2+1, 5)=mod (3, 5)=3; for k=3, k'=mod (3+1, 5)=mod (4, 5)=4; and, for k=4, then k'=mod (4+1, 5)=mod (5, 5)=0. Note that a typical number of cells for the ring buffer 400 would be 1024. Of course, the ring buffer 400 may have any number of cells.

Figure 6A:
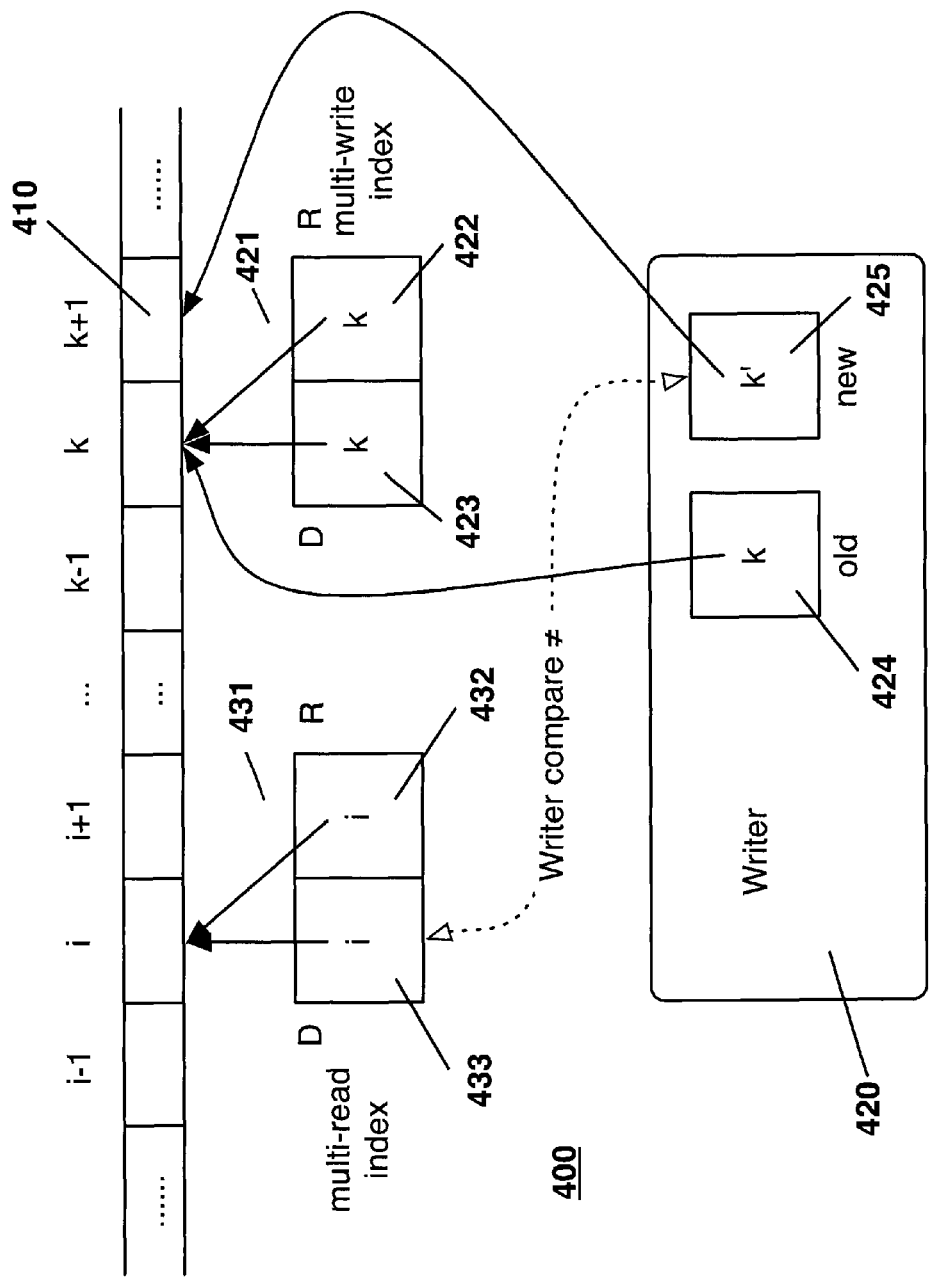
FIG. 6a is a block diagram illustrating testing against overrun for a writer of the multi-reader, multi-writer lock-free ring buffer in accordance with an embodiment of the invention.
Figure 6B:
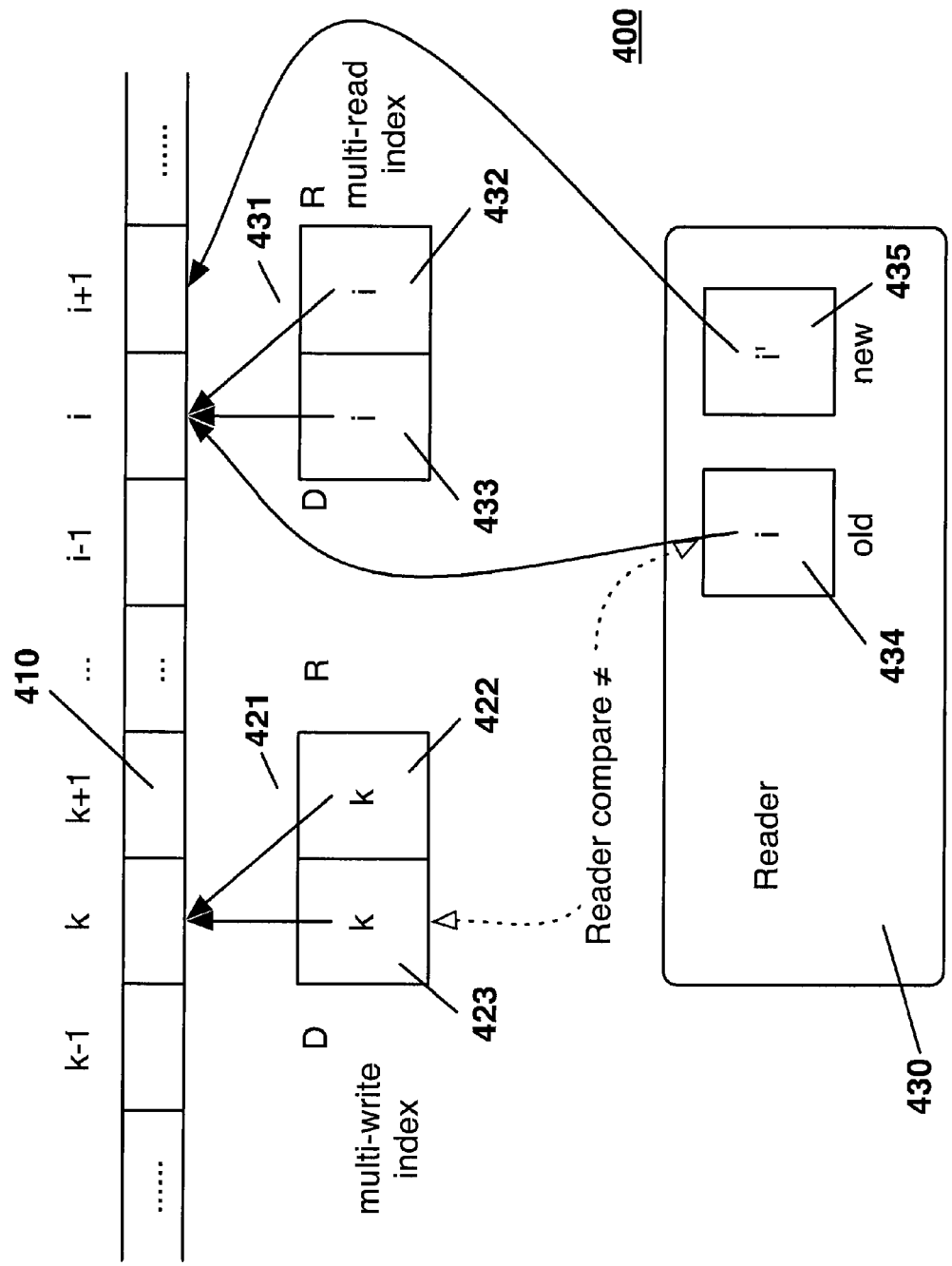
FIG. 6b is a block diagram illustrating testing against overrun for a reader of the multi-reader, multi-writer lock-free ring buffer in accordance with an embodiment of the invention.

FIG. 6a is a block diagram illustrating testing against overrun for a writer 420 of the multi-reader, multi-writer lock-free ring buffer 400 in accordance with an embodiment of the invention. And, FIG. 6b is a block diagram illustrating testing against overrun for a reader 430 of the multi-reader, multi-writer lock-free ring buffer 400 in accordance with an embodiment of the invention. For the writers (e.g., 420), this testing involves comparing the new variable 425 against the Done index 433 from the read multi-index 431. If the two are equal, then the ring buffer 400 is full and the operation cannot complete until some reader (e.g., 430) has moved the read multi-index 431 ahead. This step is shown in FIG. 6a. For the readers (e.g., 430), this testing involves comparing the old variable 434 against the Done index 423 from the write multi-index 421. If the two are equal, then the ring buffer 400 is empty (i.e., nothing left to read) and the operation cannot complete until some writer (e.g., 420) moves the write multi-index 421 ahead. This step is shown in FIG. 6b.

Note that the reader 430 does not need the value of the new variable 435 until the next step, described below with reference to FIG. 7. As such, the reader 430 may perform the previous and present steps, described with reference to FIGS. 5, 6a, and 6b above, in any order.

Figure 7:
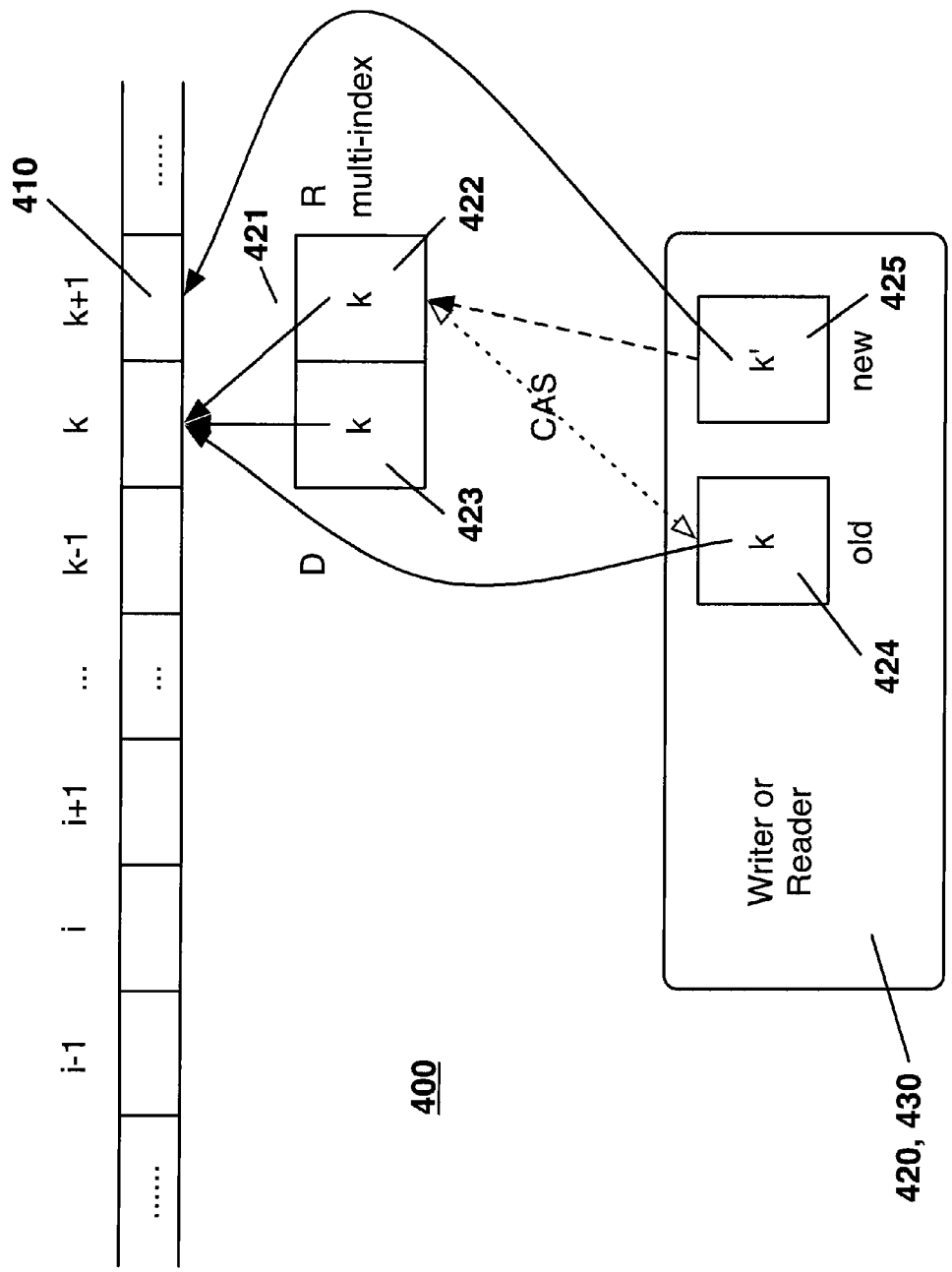
FIG. 7 is a block diagram illustrating making a reservation attempt for the multi-reader, multi-writer lock-free ring buffer in accordance with an embodiment of the invention.

FIG. 7 is a block diagram illustrating making a reservation attempt for the multi-reader, multi-writer lock-free ring buffer 400 in accordance with an embodiment of the invention. Assuming success in the previous step (i.e., there is room in the ring buffer 400 in the case of a writer 420 and there is data in the ring buffer 400 in the case of a reader 430), a CAS operation (or instruction) is executed with the Reserved index value 422 as the target, the value of the old variable 424 as the compare value, and the value of the new variable 425 as the swap value. If the CAS fails (i.e., 422 is not equal to 424), then the step of saving the initial index state described with reference to FIG. 4 above is returned to and repeated. If the CAS succeeds (i.e., 422 is equal to 424), then a slot 410 has been reserved and the next step can be taken, described with reference to FIG. 8 below. This step is shown in FIG. 7.

Note that the compare-and-swap ("CAS") operation atomically compares the contents of a memory location (e.g., 422) to a given value (e.g., 424) and, if they are the same, modifies the contents of that memory location (i.e., 422) to a given new value (i.e., 425). The result of the operation indicates whether it performed the substitution. This may be performed either with a simple Boolean response (e.g., a compare-and-set), or by returning the value read from the memory location (i.e., 422) and not the value (i.e., 425) written to it.

Figure 8:
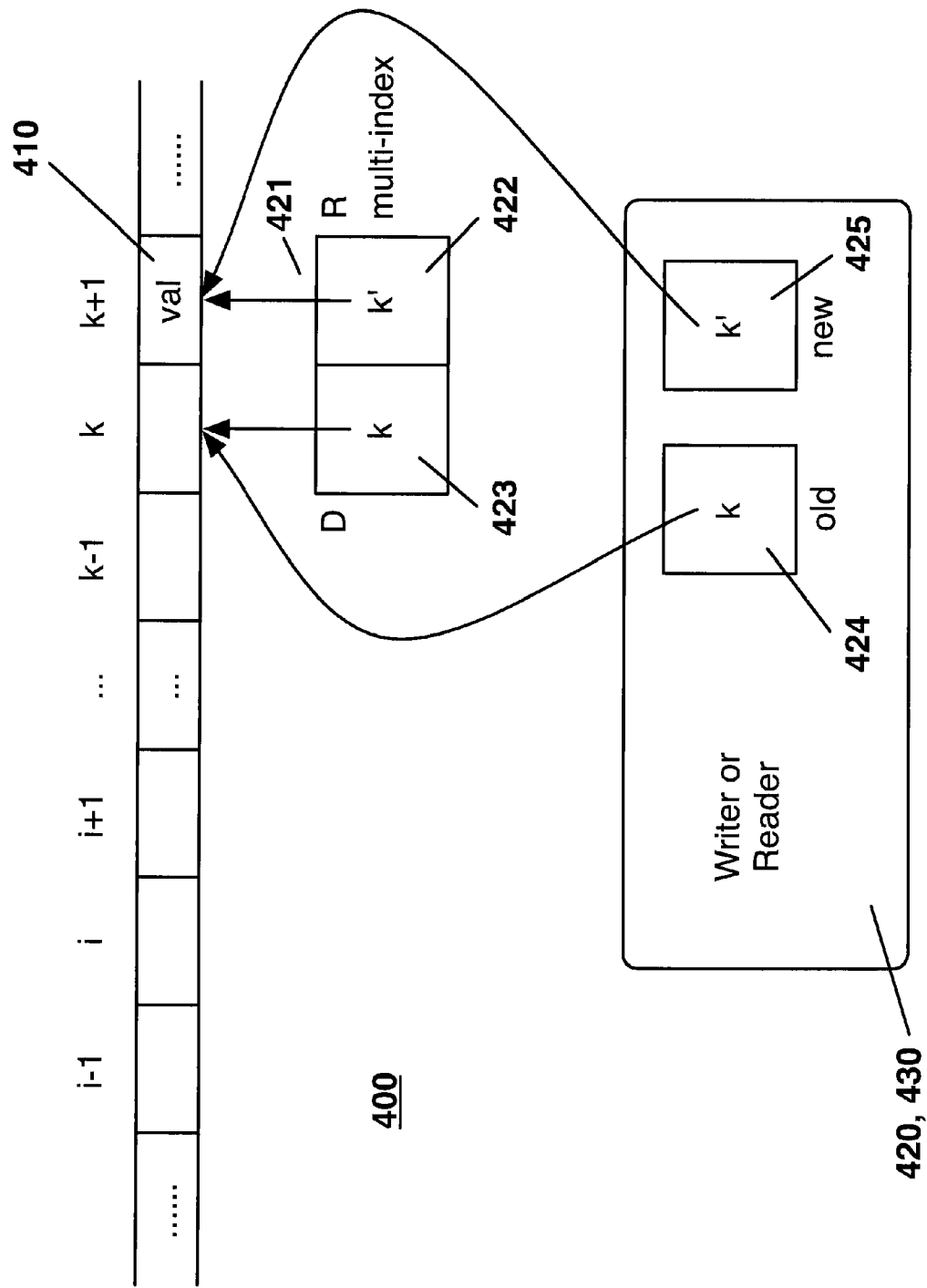
FIG. 8 is a block diagram illustrating filling or emptying a successfully reserved slot for the multi-reader, multi-writer lock-free ring buffer in accordance with an embodiment of the invention.

FIG. 8 is a block diagram illustrating filling or emptying a successfully reserved slot 410 for the multi-reader, multi-writer lock-free ring buffer 400 in accordance with an embodiment of the invention. For writers (e.g., 420) this involves putting the desired data val (e.g., a reference to other data) into the ring buffer slot 410 successfully reserved in the previous step shown in FIG. 7. For readers (e.g., 430) this involves pulling desired data from a ring buffer slot. This step is shown in FIG. 8.

Figure 9:
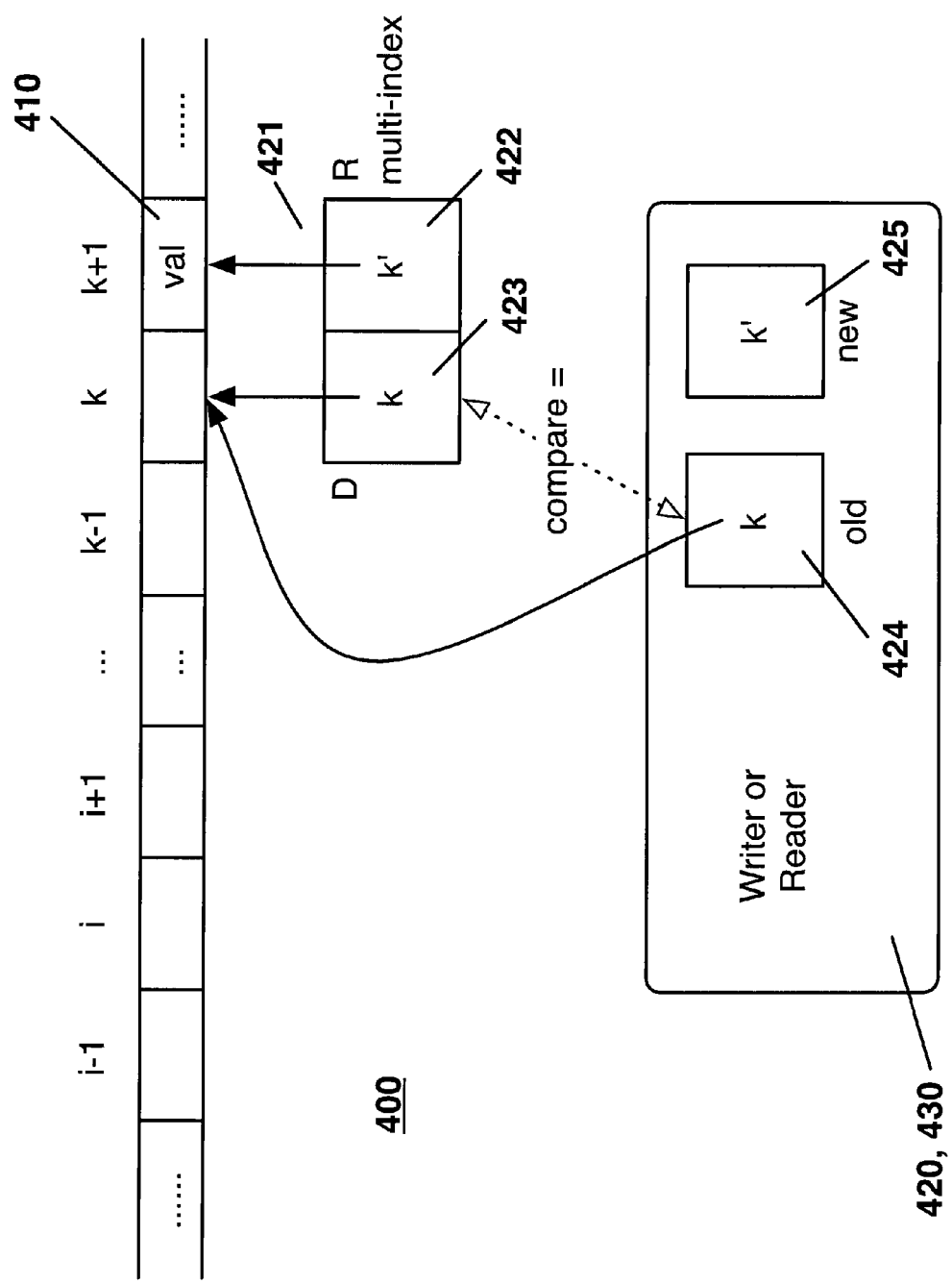
FIG. 9 is a block diagram illustrating synchronization for the multi-reader, multi-writer lock-free ring buffer in accordance with an embodiment of the invention.

FIG. 9 is a block diagram illustrating synchronization for the multi-reader, multi-writer lock-free ring buffer 400 in accordance with an embodiment of the invention. For synchronization purposes, the Done index 423 is compared to the value of the old variable 424 until the two are equal. This is necessary to prevent out of order updates to the Done index 423 when more that one thread or process is attempting to simultaneously access the multi-index 421. This step is shown in FIG. 9.

Figure 10:
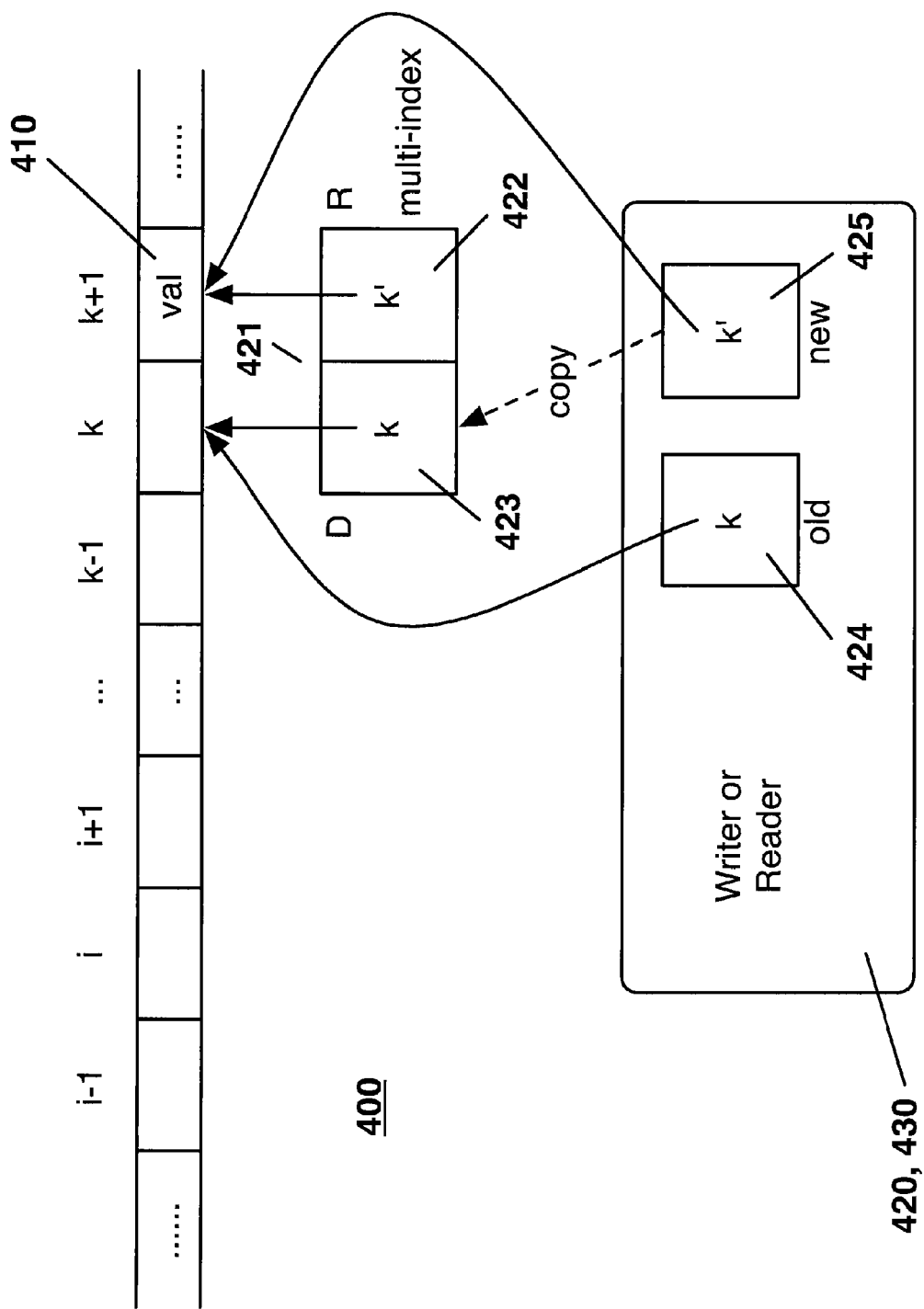
FIG. 10 is a block diagram illustrating updating of a done index for the multi-reader, multi-writer lock-free ring buffer in accordance with an embodiment of the invention.

FIG. 10 is a block diagram illustrating updating of the Done index 423 for the multi-reader, multi-writer lock-free ring buffer 400 in accordance with an embodiment of the invention. When the Done index 423 is equal to the value of the old variable 424, the value of the new variable 425 is copied to the Done index 423. This step is shown in FIG. 10.

Figure 11:
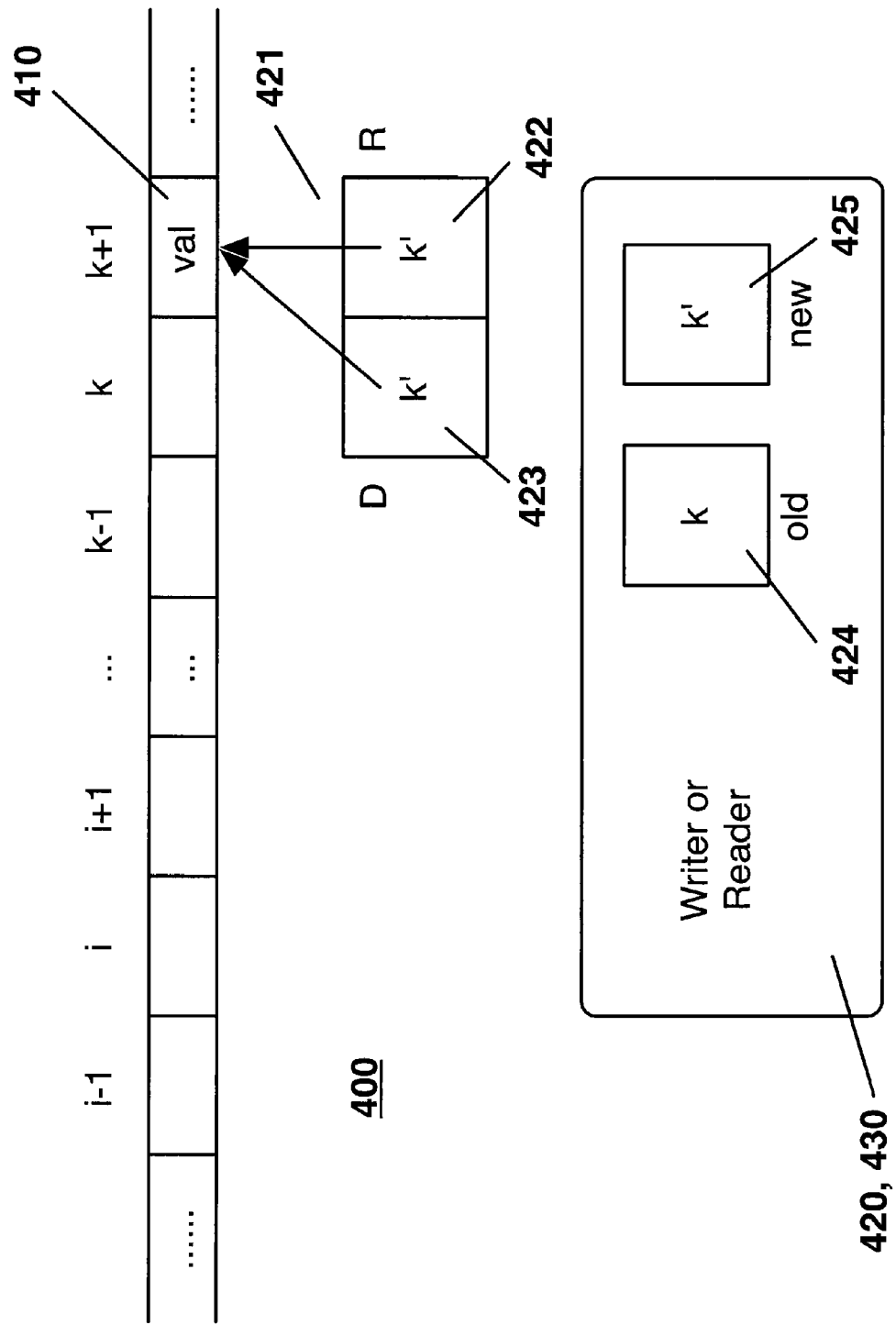
FIG. 11 is a block diagram illustrating moving forward of indices for the multi-reader, multi-writer lock-free ring buffer in accordance with an embodiment of the invention.

FIG. 11 is a block diagram illustrating moving forward of the indices 421, 431 for the multi-reader, multi-writer lock-free ring buffer 400 in accordance with an embodiment of the invention. At the end of the operation, as shown in FIG. 11, the Done 422 and Reserved 423 indices have been moved forward to indicate cell k'.

FIG. 12 is a listing of exemplary pseudo code for implementing the multi-reader, multi-writer lock-free ring buffer 400 in accordance with an embodiment of the invention.

The invention may provide several advantages including the following. First, it provides significantly lower latency and lower processing overhead in environments involving large numbers of readers and/or writers. Second, each reader and each writer uses exactly the same code to arbitrate access to the ring buffer. Third, it can be easily implemented in software on any general purpose processor which implements an atomic compare-and-swap ("CAS") instruction or an equivalent such as LL/SC instructions. All recent general purpose processors typically implement the CAS instruction.

The invention may be applied in software environments including the following. First, the invention is advantageous where there are messages, jobs, or other items that can be partitioned in discrete chunks that any of a number of different output threads can process (i.e., one writer, multiple readers). For example, taking a large number of incoming data packets and doing full data decodes on them with different threads running on different processor cores each taking a data packet for decode as it becomes available. As another example, performing parallel processing operations where a single incoming data stream (such as a stock ticker) is "fanned" out to a large number of threads running on different processor cores in order to speed up processing as in performing predictive analysis of the incoming data. Second, the invention is advantageous where there are messages, jobs, or other items being created by a number of different threads and being processed by a single output thread (i.e., multiple writer, single reader). Examples of this include: getting data packets from a number of different network links and processing them by a single higher level network protocol or network monitoring application; queuing jobs for a printer; receiving stock quotes from a number of different feeds and putting them out on a single stock ticker; receiving database requests from a number of web browsers and processing them sequentially by a single database application; and, getting multiple music/video signals (such as from music synthesizer) and forwarding them to a mixer thread. Third, the invention is advantageous where there are messages, jobs, or other items being created by a number of different threads and also being processed by multiple output threads (i.e. multiple writer, multiple readers). Examples of this include: receiving data packets from a number of different data collectors and then doing full data decodes on them with different threads running on different processor cores; queuing jobs to a bank of printers where it doesn't matter which printer is assigned the job; and, receiving HTTP requests from a number of different sources and using multiple threads in the web server to generate and send replies (i.e., the ring buffer serves to distribute the requests uniformly over the server threads).

The method of the invention may be further illustrated with the aid of simplified flowcharts.

Figure 14:
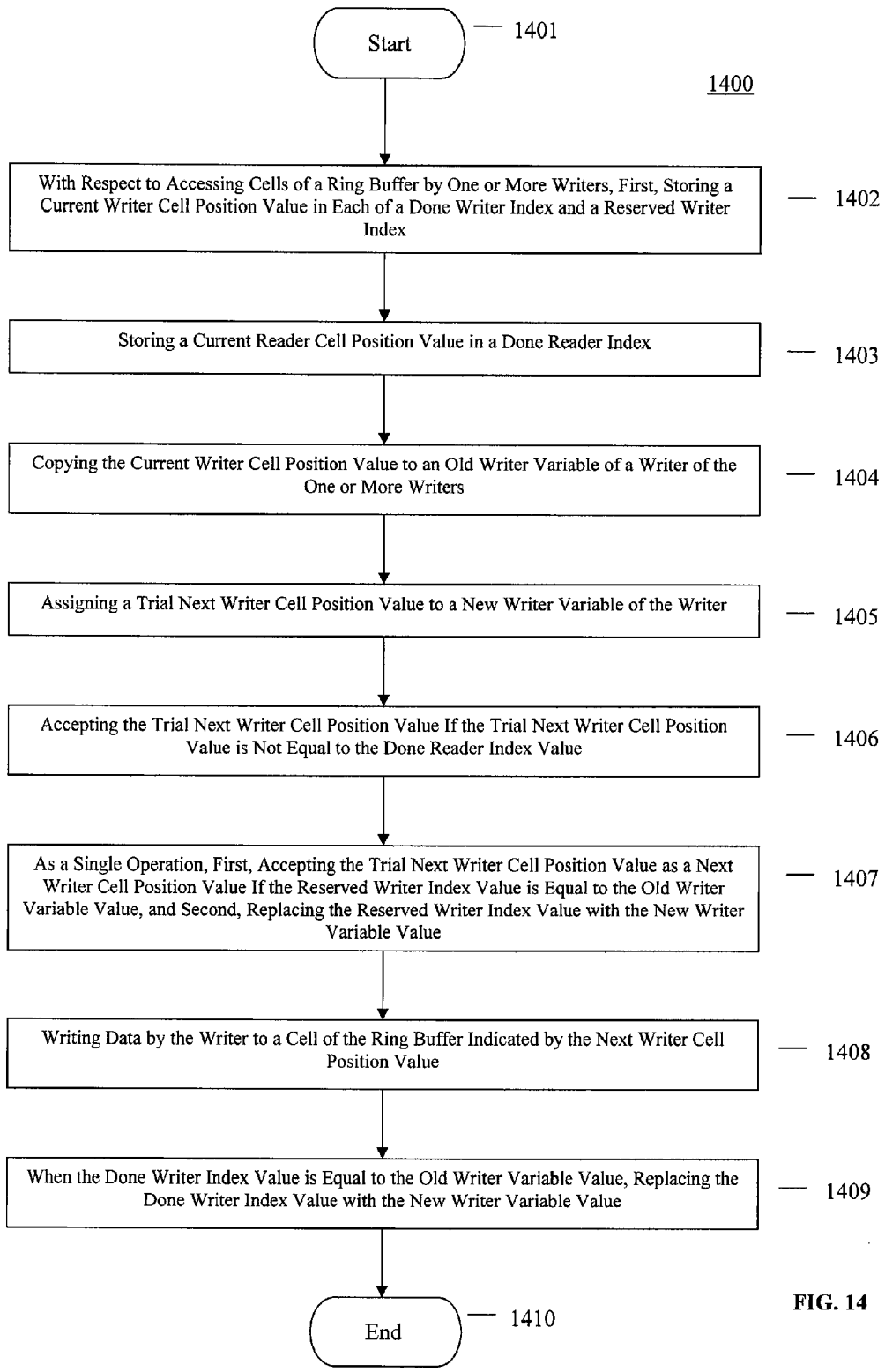
FIG. 14 is a flow chart illustrating operations of modules within the memory of a data processing system for accessing cells of a ring buffer by one or more writers, in accordance with an embodiment of the invention; and, FIG. 15 is a flow chart illustrating operations of modules within the memory of a data processing system for accessing cells of a ring buffer by one or more readers, in accordance with an embodiment of the invention.

FIG. 14 is a flow chart illustrating operations 1400 of modules 331 within the memory 330 of a data processing system 300 for accessing cells 410 of a ring buffer 400 by one or more writers 420, in accordance with an embodiment of the invention.

At step 1401, the operations 1400 start.

At step 1402, a current writer cell position value k is stored in each of a done writer index 423 and a reserved writer index 422. See FIG. 3.

At step 1403, a current reader cell position value i is stored in a done reader index 433. See FIG. 3.

At step 1404, the current writer cell position value k is copied to an old writer variable 424 of a writer 420 of the one or more writers 420. See FIG. 4.

At step 1405, a trial next writer cell position value k' is assigned to a new writer variable 425 of the writer 420. See FIG. 5.

At step 1406, the trial next writer cell position value k' is accepted if the trial next writer cell position value k' is not equal to the done reader index value i. See FIG. 6a.

At step 1407, as a single operation, first, the trial next writer cell position value k' is accepted as a next writer cell position value if the reserved writer index value k is equal to the old writer variable value k, and second, the reserved writer index value k is replaced with the new writer variable value k'. See FIG. 7.

At step 1408, data val is written by the writer 420 to a cell 410 of the ring buffer 400 indicated by the next writer cell position value k'. See FIG. 8.

At step 1409, when the done writer index value k is equal to the old writer variable value k, the done writer index value k is replaced with the new writer variable value k'. See FIGS. 9-11. Whereby, the one or more writers 420 are prevented from simultaneously accessing the cell 410 of the ring buffer 400.

At step 1410, the operations 1400 end.

In the above method, the current writer cell position value k may be not equal to the current reader cell position value i. The trial next writer cell position value k' may be equal to the old writer variable value k plus one all modulo a number n of cells 410 in the ring buffer 400. The single operation may be an atomic operation. The single operation may be a compare-and-swap ("CAS") operation. The single operation may be a load linked/store conditional ("LL/SC") pair operation. The done writer index value, the reserved writer index value, and the done reader index value may be stored in shared memory 330 accessible by the one or more writers 420. The old writer variable value and the new writer variable value may be stored in local memory 331 of the writer 420. The writer 420 may be implemented by a thread 331 and the local memory 331 may be thread local memory 331. And, the ring buffer 400 may be a circular list; the done writer index 423 may be a done writer pointer; the reserved writer index 422 may be a reserved writer pointer; and, the done reader index 433 may be a done reader pointer.

Figure 15:
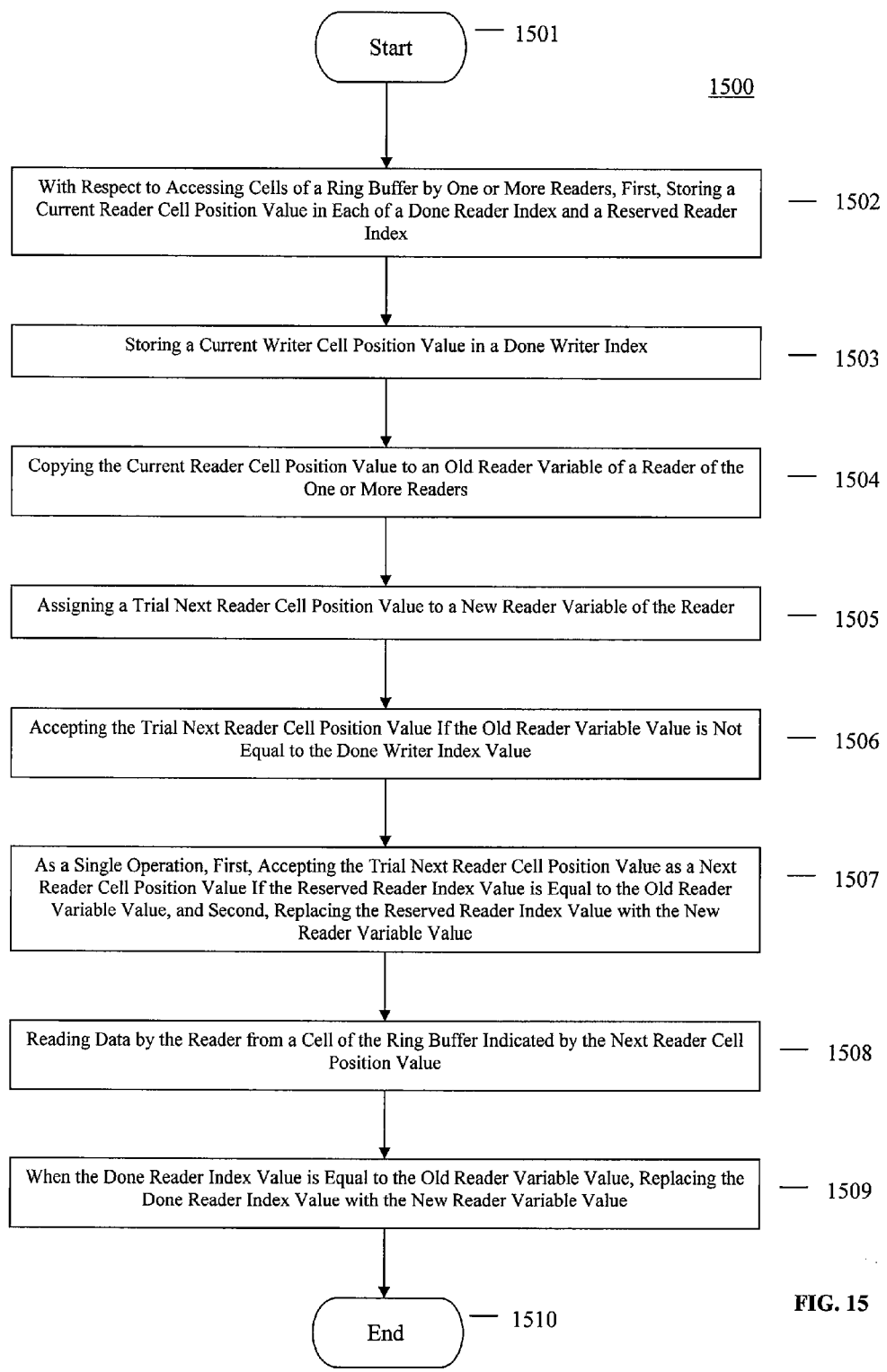

FIG. 15 is a flow chart illustrating operations 1500 of modules 331 within the memory 330 of a data processing system 300 for accessing cells 410 of a ring buffer 400 by one or more readers 430, in accordance with an embodiment of the invention.

At step 1501, the operations 1500 start.

At step 1502, a current reader cell position value i is stored in each of a done reader index 433 and a reserved reader index 432. See FIG. 3.

At step 1503, a current writer cell position value k is stored in a done writer index 423. See FIG. 3.

At step 1504, the current reader cell position value i is copied to an old reader variable 434 of a reader 430 of the one or more readers 430. See FIG. 4.

At step 1505, a trial next reader cell position value i' is assigned to a new reader variable 435 of the reader 430. See FIG. 5.

At step 1506, the trial next reader cell position value i' is accepted if the old reader variable value i is not equal to the done writer index value k. See FIG. 6b.

At step 1507, as a single operation, first, the trial next reader cell position value i' is accepted as a next reader cell position value if the reserved reader index value i is equal to the old reader variable value i, and second, the reserved reader index value i is replaced with the new reader variable value i'. See FIG. 7.

At step 1508, data is read by the reader 430 from a cell 410 of the ring buffer 400 indicated by the next reader cell position value i'. See FIG. 8.

At step 1509, when the done reader index value i is equal to the old reader variable value i, the done reader index value i is replaced with the new reader variable value i'. See FIGS. 9-11. Whereby, the one or more readers 430 are prevented from simultaneously accessing the cell 410 of the ring buffer 400.

At step 1510, the operations 1500 end.

In the above method, the current reader cell position value i may be not equal to the current writer cell position value k. The trial next reader cell position value i' may be equal to the old reader variable value i plus one all modulo a number n of cells 410 in the ring buffer 400. The single operation may be an atomic operation. The single operation may be a compare-and-swap ("CAS") operation. The single operation may be a load linked/store conditional ("LL/SC") pair operation. The done reader index value, the reserved reader index value, and the done writer index value may be stored in shared memory 330 accessible by the one or more readers 430. The old reader variable value and the new reader variable value may be stored in local memory 331 of the reader 430. The reader 430 may be implemented by a thread 331 and the local memory 331 may be thread local memory 331. And, the ring buffer 400 may be a circular list; the done reader index 433 may be a done reader pointer; the reserved reader index 432 may be a reserved reader pointer; and, the done writer index 423 may be a done writer pointer.

While this invention is primarily discussed as a method, a person of ordinary skill in the art will understand that the apparatus discussed above with reference to a data processing system 300, may be programmed to enable the practice of the method of the invention. Moreover, an article of manufacture for use with a data processing system 300, such as a pre-recorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 can be contained in a data carrier product according to one embodiment. This data carrier product can be loaded into and run by the data processing system 300. In addition, the sequences of instructions which when executed cause the method described herein to be performed by the data processing system 300 can be contained in a computer software product (e.g., software modules) according to one embodiment. This computer software product can be loaded into and run by the data processing system 300. Furthermore, the sequences of instructions which when executed cause the method described herein to be performed by the data processing system 300 can be contained in an integrated circuit product (e.g., hardware modules) including a coprocessor or memory according to one embodiment. This integrated circuit product can be installed in the data processing system 300. Moreover, the sequences of instructions which when executed cause the method described herein to be performed can be contained in an integrated circuit product (e.g., hardware modules, a field programmable gate array ("FPGA"), an application specific integrated circuit ("ASIC"), etc.) according to one embodiment. This integrated circuit product can be installed in the data processing system 300.

The embodiments of the invention described above are intended to be exemplary only. Those skilled in this art will understand that various modifications of detail may be made to these embodiments, all of which come within the scope of the invention.

What is claimed is:

1. A method for accessing cells of a ring buffer by two or more writers, comprising:

storing a current writer cell position value in each of a done writer index as a done writer index value and a reserved writer index as a reserved writer index value;

storing a current reader cell position value in a done reader index as a done reader index value;

for each of the two or more writers:

copying the current writer cell position value to an old writer variable as an old writer variable value;

assigning a trial next writer cell position value to a new writer variable as a new writer variable value;

accepting the trial next writer cell position value if the trial next writer cell position value is not equal to the done reader index value;

as a single operation, first, accepting the trial next writer cell position value as a next writer cell position value if the reserved writer index value is equal to the old writer variable value, and second, replacing the reserved writer index value with the new writer variable value;

after completing the single operation, writing data to a cell of the ring buffer indicated by the next writer cell position value; and, when the done writer index value is equal to the old writer variable value, replacing the done writer index value with the new writer variable value;

whereby the two or more writers are prevented from simultaneously accessing the cell of the ring buffer.

2. The method of claim 1 wherein the current writer cell position value is not equal to the current reader cell position value.

3. The method of claim 2 wherein, for each of the two or more writers, the trial next writer cell position value is equal to the old writer variable value plus one all modulo a number of cells in the ring buffer.

4. The method of claim 1 wherein the single operation is an atomic operation.

5. The method of claim 1 wherein the single operation is a compare-and-swap ("CAS") operation.

6. The method of claim 1 wherein the single operation is a load linked/store conditional ("LL/SC") pair operation.

7. The method of claim 1 wherein the done writer index value, the reserved writer index value, and the done reader index value are stored in shared memory accessible by the two or more writers.

8. The method of claim 1 wherein the old writer variable value and the new writer variable value are stored in respective local memory of the two or more writers.

9. The method of claim 8 wherein the two or more writers are implemented by a respective thread and the respective local memory is respective thread local memory.

10. The method of claim 1 wherein: the ring buffer is a circular list; the done writer index is a done writer pointer; the reserved writer index is a reserved writer pointer; and, the done reader index is a done reader pointer.

11. A method for accessing cells of a ring buffer by two or more readers, comprising:
storing a current reader cell position value in each of a done reader index as a done reader index value and a reserved reader index as a reserved reader index value;
storing a current writer cell position value in a done writer index as a done writer index value;
for each of the two or more readers:
copying the current reader cell position value to an old reader variable as an old reader variable value;
assigning a trial next reader cell position value to a new reader variable as a new reader variable value;
accepting the trial next reader cell position value if the trial next reader cell position value is not equal to the done writer index value;
as a single operation, first, accepting the trial next reader cell position value as a next reader cell position value if the reserved reader index value is equal to the old reader variable value, and second, replacing the reserved reader index value with the new reader variable value;
after completing the single operation, reading data from a cell of the ring buffer indicated by the next reader cell position value; and,
when the done reader index value is equal to the old reader variable value, replacing the done reader index value with the new reader variable value;
whereby the two or more readers are prevented from simultaneously accessing the cell of the ring buffer.

12. The method of claim 11 wherein the current reader cell position value is not equal to the current writer cell position value.

13. The method of claim 12 wherein, for each of the two or more readers, the trial next reader cell position value is equal to the old reader variable value plus one all modulo a number of cells in the ring buffer.

14. The method of claim 11 wherein the single operation is an atomic operation.

15. The method of claim 11 wherein the single operation is a compare-and-swap ("CAS") operation.

16. The method of claim 11 wherein the single operation is a load linked/store conditional ("LL/SC") pair operation.

17. The method of claim 11 wherein the done reader index value, the reserved reader index value, and the done writer index value are stored in shared memory accessible by the two or more readers.

18. The method of claim 11 wherein the old reader variable value and the new reader variable value are stored in respective local memory of the two or more readers.

19. The method of claim 18 wherein the two or more readers are implemented by a respective thread and the respective local memory is respective thread local memory.

20. The method of claim 11 wherein: the ring buffer is a circular list; the done reader index is a done reader pointer; the reserved reader index is a reserved reader pointer; and, the done writer index is a done writer pointer.

21. A system for accessing cells of a ring buffer by two or more writers, comprising:
a processor coupled to memory; and,
modules within the memory and executed by the processor, the modules including:
a module for storing a current writer cell position value in each of a done writer index as a done writer index value and a reserved writer index as a reserved writer index value;
a module for storing a current reader cell position value in a done reader index as a done reader index value;
for each of the two or more writers:
a module for copying the current writer cell position value to an old writer variable as an old writer variable value;
a module for assigning a trial next writer cell position value to a new writer variable as a new writer variable value;
a module for accepting the trial next writer cell position value if the trial next writer cell position value is not equal to the done reader index value;
a module for, as a single operation, first, accepting the trial next writer cell position value as a next writer cell position value if the reserved writer index value is equal to the old writer variable value, and second, replacing the reserved writer index value with the new writer variable value;
a module for, after completing the single operation, writing data to a cell of the ring buffer indicated by the next writer cell position value; and,
a module for, when the done writer index value is equal to the old writer variable value, replacing the done writer index value with the new writer variable value;
whereby the two or more writers are prevented from simultaneously accessing the cell of the ring buffer.

22. A system for accessing cells of a ring buffer by two or more readers, comprising:
a processor coupled to memory; and,
modules within the memory and executed by the processor, the modules including:
a module for storing a current reader cell position value in each of a done reader index as a done reader index value and a reserved reader index as a reserved reader index value;
a module for storing a current writer cell position value in a done writer index as a done writer index value;
for each of the two or more readers:
a module for copying the current reader cell position value to an old reader variable as an old reader variable value;
a module for assigning a trial next reader cell position value to a new reader variable as a new reader variable value;
a module for accepting the trial next reader cell position value if the trial next reader cell position value is not equal to the done writer index value;

a module for, as a single operation, first, accepting the trial next reader cell position value as a next reader cell position value if the reserved reader index value is equal to the old reader variable value, and second, replacing the reserved reader index value with the new reader variable value;

a module for, after completing the single operation, reading data from a cell of the ring buffer indicated by the next reader cell position value; and, a module for, when the done reader index value is equal to the old reader variable value, replacing the done reader index value with the new reader variable value;

whereby the two or more readers are prevented from simultaneously accessing the cell of the ring buffer.

* * * * *